(12) United States Patent
Shimada

(10) Patent No.: US 6,934,020 B2
(45) Date of Patent: Aug. 23, 2005

(54) LASER MICROSCOPE

(75) Inventor: Yoshihiro Shimada, Sagamihara (JP)

(73) Assignee: Olympus Optical Co., Ltd., Tokyo (JP)

(*) Notice: Subject to any disclaimer, the term of this patent is extended or adjusted under 35 U.S.C. 154(b) by 372 days.

(21) Appl. No.: 10/186,573

(22) Filed: Jul. 1, 2002

(65) Prior Publication Data
US 2003/0007145 A1 Jan. 9, 2003

(30) Foreign Application Priority Data
Jul. 3, 2001 (JP) .................................... 2001-202584

(51) Int. Cl.⁷ .............................................. G01J 3/44
(52) U.S. Cl. ...................................................... 356/301
(58) Field of Search .................................. 356/301, 318

(56) References Cited

U.S. PATENT DOCUMENTS

| | | | |
|---|---|---|---|
| 4,405,237 A | | 9/1983 | Manuccia et al. |
| 4,512,660 A | * | 4/1985 | Goldberg ..................... 356/301 |
| 5,120,961 A | | 6/1992 | Levin et al. |
| 5,303,710 A | | 4/1994 | Bashkansky et al. |
| RE34,782 E | * | 11/1994 | Dandliker et al. .......... 356/318 |
| 6,108,081 A | * | 8/2000 | Holtom et al. .............. 356/301 |
| 6,151,522 A | * | 11/2000 | Alfano et al. ................ 356/301 |
| 6,166,385 A | | 12/2000 | Webb et al. |

FOREIGN PATENT DOCUMENTS

JP 4-51784 B2 8/1992

OTHER PUBLICATIONS

Patent Abstracts of Japan, vol. 012, No. 133, Apr. 22, 1988, abstract of JP Publication No. 62–255854 A (Natl Aerospace Lab.), published Nov. 7, 1987.

Duncan M. D. Et al., "A Review of the NRL Cars Microscope" AIP conference Proceedings, American Institute of Physics, New York, NY, US, vol. 160, Oct. 20, 1986, pp. 631–637, XP009028006, ISSN: 0094–243X.

Duncan M. D. Et al., "Scanning Coherent Anti–Stokes Raman Microscope" Optics Letters, Optical society of America, Washington, US, vol. 7, No. 8, Aug. 1, 1982, pp. 350–352, XP000710158, ISSN: 0146–9592.

* cited by examiner

Primary Examiner—Zandra Smith
Assistant Examiner—Kara Geisel
(74) Attorney, Agent, or Firm—Frishauf, Holtz, Goodman & Chick, P.C.

(57) ABSTRACT

A laser microscope includes a laser light emitting system which emits a pump beam and a Stokes beam having different frequencies, and a common optical fiber having one end and the other end. The pump beam and the Stokes beam emitted from the laser light emitting system are incident on the one end thereof and emitted from the other end thereof. A beam irradiating mechanism condenses and irradiates the pump beam and the Stokes beam emitted from the other end of the optical fiber, onto a sample via the objective lens, thereby making an anti-Stokes beam be emitted from the sample. A photo detector detects the anti-Stokes beam emitted from the sample. A beam selecting mechanism allows only the anti-Stokes beam of the pump beam, the Stokes beam and the anti-Stokes beam to be received on the photo detector.

18 Claims, 4 Drawing Sheets ic-Stokes beam

LASER MICROSCOPE

CROSS-REFERENCE TO RELATED APPLICATIONS

This application is based upon and claims the benefit of priority from the prior Japanese Patent Application No. 2001-202584, filed Jul. 3, 2001, the entire contents of which are incorporated herein by reference.

BACKGROUND OF THE INVENTION

1. Field of the Invention

The present invention relates to a laser microscope irradiating a pump beam and a Stokes beam having different frequencies onto a sample, and detecting an anti-Stokes beam emitted from the sample, thereby obtaining an image.

2. Description of the Related Art

To date, in fields of research in medical science or biology, the study of cell functions has been actively carried out. In recent years, not only cell functions are studied, but also, the need to directly study the relationship between the function which is the subject and the protein molecular structure has increased.

A method of directly observing Raman scattering light called a molecular fingerprint is widely used. In particular, attention has focused on CARS (Coherent Anti-Stokes Raman Scattering) spectroscopy which can easily eliminate fluorescence from a sample. CARS spectroscopy irradiates a pump beam and a Stokes beam onto a sample, and detects an anti-Stokes beam (anti-Stokes Raman scattering light) emitted from the sample.

As shown in FIG. 5 and FIG. 6, Jpn. Pat. Appln. KOKOKU Publication No. 4-51784 has disclosed a laser measuring device 100. The laser measuring device 100 has, as a laser light source, a pulse YAG laser 102 for oscillating a laser beam having a wavelength of 1064 nm. In front of the laser 102, a second higher harmonic generator 104 for converting the wavelength of a laser beam to 532 nm and emitting a pump beam $\omega_{11}$ (wavelength $\lambda_{11}$) is provided. On the optical path of the beam $\omega_{11}$, a beam splitter 106 is disposed so as to divide the beam $\omega_{11}$ in two directions. The beam $\omega_{11}$ entering the beam splitter 106 is divided into a reflecting beam $\omega_{11}$ and a transmitted beam $\omega_{11}'$.

A mirror 108 reflecting the reflecting beam $\omega_{11}$ is provided on the optical path of the reflecting beam $\omega_{11}$.

On the optical path of the transmitted beam $\omega_{11}'$, there is provided a dye laser 110 converting the beam $\omega_{11}'$ to a Stokes beam $\omega_{22}$ having a different frequency (wavelength of 607 nm) and emitting it. Further, on the optical path of the Stokes beam $\omega_{22}$, a knife edge 112 for blocking half of the transverse cross-sectional pattern of the Stokes beam $\omega_{22}$ and making it semicircular is disposed.

Further, a dichroic mirror 114 is provided at the position where the pump beam $\omega_{11}$ and the Stokes beam $\omega_{22}$ intersect on the optical path. The pump beam (reflecting beam) $\omega_{11}$ passes through the dichroic mirror 114, and the dichroic mirror 114 reflects the Stokes beam $\omega_{22}$, and makes them into one beam $\omega_{11}$, $\omega_{22}$.

On the optical path of the beam $\omega_{11}$, $\omega_{22}$, a lens 116 for condensing the beam $\omega_{11}$, $\omega_{22}$ at a predetermined distance is provided. Further, a sample M is disposed at this condensing position. The beam $\omega_{11}$, $\omega_{22}$ is irradiated onto the sample M, and an anti-Stokes beam $\omega_{33}$ is generated from the sample M. Note that, in addition to the anti-Stokes beam $\omega_{33}$, the pump beam $\omega_{11}$ and the Stokes beam $\omega_{22}$ are included in the beam passing through the sample M.

On the optical path of the beams $\omega_{11}$, $\omega_{22}$, $\omega_{33}$, a lens 118 for making the beams $\omega_{11}$, $\omega_{22}$, $\omega_{33}$ into parallel light is provided. Further, on the optical path of the beams $\omega_{11}$, $\omega_{22}$, $\omega_{33}$, there is provided a knife edge 120 blocking only the mixed portion of the pump beam $\omega_{11}$ and the Stokes beam $\omega_{22}$. On the optical path of the beams $\omega_{11}$, $\omega_{33}$, an appropriate wavelength selector 122 blocking only the pump beam $\omega_{11}$ is provided.

Further, on the optical path of the remaining anti-Stokes beam $\omega_{33}$, two reflecting mirrors 124 for reflecting the anti-Stokes beam $\omega_{33}$ are provided. A spectroscope 126 for dividing the anti-Stokes beam $\omega_{33}$ into a spectrum is also provided on the optical path of the beam $\omega_{33}$. Further, in front of the spectroscope 126, a detector 128 is provided, and the divided spectrum is detected.

Moreover, a mini computer 130 is connected to the detector 128. Further, an image displaying device 132 is connected to the mini computer 130. The spectrum detected at the detector 128 is converted to an electric signal by using the mini computer 130, and the signal is displayed on the image displaying device 132.

Adjustment for matching the phases of the beams $\omega_{11}$, $\omega_{22}$, $\omega_{33}$ is carried out by removing the knife edge 120 from the above-described structure and detecting the whole anti-Stokes beam $\omega_{33}$ contained in the transverse cross-sectional pattern of the pump beam $\omega_{11}$. After the adjustment is carried out, only the mixed portion of the pump beam $\omega_{11}$ and the Stokes beam $\omega_{22}$ are blocked by the knife edge 120. Further, the anti-Stokes beam $\omega_{33}$, whose spatial resolution generated from a minute intersection point in space is high, is easily obtained.

Accordingly, the laser measuring device 100 has means in which the Stokes beam $\omega_{22}$ (wavelength $\lambda_{22}$) is mixed in one portion of the transverse cross-sectional pattern of the pump beam $\omega_{11}$ (wavelength $\lambda_{11}$) and is made incident on a sample M. Further, at the exiting side, only the mixed portion of the pump beam $\omega_{11}$ and the Stokes beam $\omega_{22}$ is blocked, and there is provided means in which the anti-Stokes beam $\omega_{33}$ contained in the transverse cross-sectional pattern of the other pump beam $\omega_{11}$ is extracted.

Such a structure relates to precise adjustment of a minimum crossed axes angle method having a high spatial resolution. However, basically, it is difficult to remove the possibility that misalignment of the optical axes will occur. For example, even if an ideal adjustment is carried out, there is the possibility that misalignment will occur due to effects such as changes in the environmental temperature, vibration, or the like. Thus, even if the exiting orientations of the pump beam $\omega_{11}$ and the Stokes beam $\omega_{22}$ coincide, there is the possibility that misalignment will occur.

Accordingly, due to misalignment occurring, the strength of the anti-Stokes beam is weakened. Moreover, there is not only this, but also the possibility that the pump beam and the Stokes beam, which do not contribute to the generation of the anti-Stokes beam, will be detected as noise components. Namely, in detecting the anti-Stokes beam, there is the drawback that deterioration of the SN ratio is caused.

Further, in the prior art, when misalignment occurs, there are cases in which the pump beam and the Stokes beam, which do not contribute to emission of the anti-Stokes beam, are irradiated onto the sample. Therefore, although this suffices when the sample is a chemical substance, in the case of living cells or tissues, there is the possibility that these two beams will damage the sample.

BRIEF SUMMARY OF THE INVENTION

The present invention provides a laser microscope which suppresses generation of misalignment, and can detect an anti-Stokes beam at a high SN ratio, and is optimum for observing living cells or tissues.

According to an aspect of the present invention, there is provided a laser microscope comprising:

a laser light emitting system which emits a pump beam and a Stokes beam having different frequencies;

a common optical fiber having one end and the other end, the pump beam and the Stokes beam emitted from the laser light emitting system being incident on the one end thereof and emitted from the other end thereof;

a beam irradiating mechanism which has an objective lens and which condenses and irradiates the pump beam and the Stokes beam emitted from the other end of the optical fiber onto a sample via the objective lens, thereby making an anti-Stokes beam be emitted from the sample;

a photo detector which detects the anti-Stokes beam emitted from the sample; and a beam selecting mechanism which prevents the pump beam and the Stokes beam from passing through the photo detector, and makes the anti-Stokes beam pass through.

Additional advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate presently preferred embodiment of the invention, and together with the general description given above and the detailed description of the preferred embodiment given below, serve to explain the principles of the invention.

DETAILED DESCRIPTION OF THE INVENTION

Preferable embodiments of the present invention will be described hereinafter with reference to the drawings.

First, a first embodiment of the invention will be described by using FIGS. 1 through 3.

Figure 1:
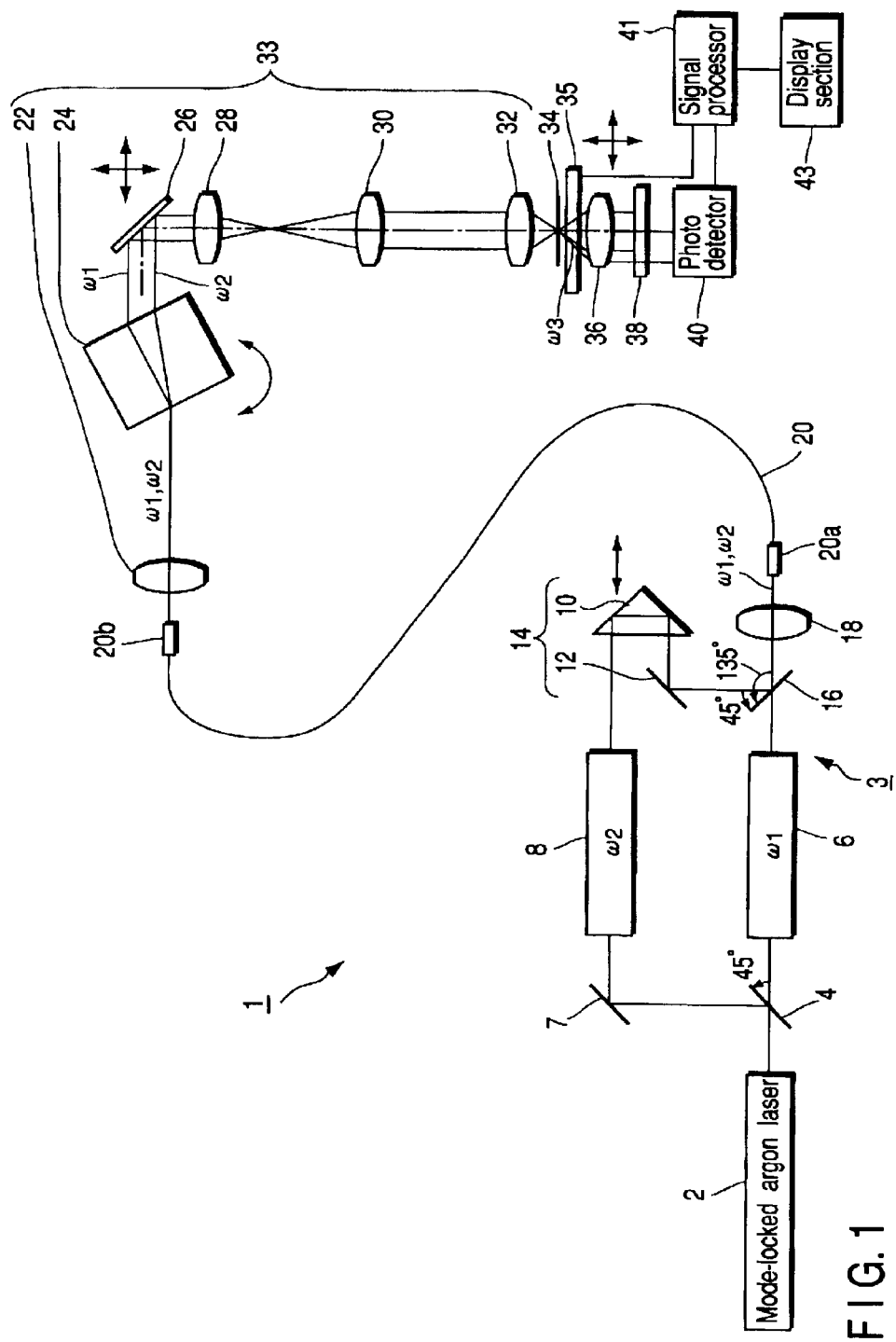
FIG. 1 is a schematic diagram showing a structure of a laser microscope according to a first embodiment of the present invention.

As shown in FIG. 1, a laser microscope 1 is provided with, as a laser light emitting system 3, a mode-locked argon laser (a laser light source) 2 which emits a laser beam in a predetermined direction from a light-emitting opening (not shown). A beam splitter 4 is disposed in front of the laser 2. The beam splitter 4 divides the incident laser beam into a transmitted beam and a reflected beam to be reflected in a direction perpendicular to the transmitted beam. A first dye laser 6, which emits a pump beam $\omega_1$ (wavelength of 570 nm), is disposed on an optical path of the transmitted beam.

On the other hand, a reflecting mirror 7 and a second dye laser 8 which emits a Stokes beam $\omega_2$ (whose wavelength is variable from 620 nm to 680 nm) are disposed on the optical path of the reflected beam.

Note that the first and second dye lasers 6, 8 are respectively pulse oscillated at the same repeating frequencies as the mode-locked argon laser 2.

An optical delay device 14 is provided in front of the second dye laser 8. As the optical delay device 14, for example, a prism 10 and a reflecting mirror 12 are successively disposed in front of the second dye laser 8. The Stokes beam $\omega_2$ which is incident on the prism 10 is reflected plural times, and is emitted toward the reflecting mirror 12. Namely, due to the position of the prism 10 being adjusted along the optical axis of incidence, the delay amount is adjusted.

A dichroic mirror 16 is disposed at a position of intersection, on the optical path, of the pump beam $\omega_1$ emitted from the first dye laser 6 and the Stokes beam $\omega_2$. The pump beam $\omega_1$ passes through the dichroic mirror 16, and the dichroic mirror 16 reflects the Stokes beam $\omega_2$. Namely, the pump beam $\omega_1$ and the Stokes beam $\omega_2$ are merged.

A condenser lens 18 is disposed on the optical path of the pump beam $\omega_1$ and the Stokes beam $\omega_2$ merged in this way (hereinafter called beams $\omega_1$, $\omega_2$). The condenser lens 18 condenses the incident beams $\omega_1$, $\omega_2$ at a predetermined focal length. The laser light emitting system 3 is formed in this way.

One end (incident end) 20a of an optical fiber (a single mode fiber) 20 having an arbitrary length is disposed at the condensing position where the beams $\omega_1$, $\omega_2$ are condensed. The beams $\omega_1$, $\omega_2$ incident on the incident end 20a are transmitted to the other end (emitting end) 20b of the optical fiber 20 and are emitted from the emitting end 20b.

At this time, the positions where the beams $\omega_1$, $\omega_2$ (the pump beam $\omega$and the Stokes beam $\omega_2$) are emitted coincide completely. Thus, occurrence of misalignment of the optical axes is suppressed.

An irradiating mechanism 33 for guiding the beams $\omega_1$, $\omega_2$ to a sample 34 to be described later, is provided on the optical path of the beams $\omega_1$, $\omega_2$.

The irradiating mechanism 33 is firstly provided with a collimator lens 22 which makes the incident beams $\omega_1$, $\omega_2$ into parallel beams. A plane parallel body 24, which is formed from a glass material for example, is disposed in front of the collimator lens 22. The plane parallel body 24 is held so as to be rotatable around an axis perpendicular to the surface of FIG. 1. The plane parallel body 24 splits the beams $\omega_1$, $\omega_2$ incident from one side thereof into the pump beam $\omega_1$ and the Stokes beam $\omega_2$. These two beams $\omega_1$, $\omega_2$ are respectively refracted at the other side and emitted parallel to one to another. A movable mirror 26 is provided in front of the emission of the two beams $\omega_1$, $\omega_2$ which have passed through the plane parallel body 24. The movable mirror 26 is provided in order to lead the beams $\omega_1$, $\omega_2$ onto the sample 34, and is configured to be movable in the direction of the arrows in FIG. 1. Thus, the beams $\omega_1$, $\omega_2$ reflected on the movable mirror 26 are movable parallel by an arbitrary distance.

Figure 2A:
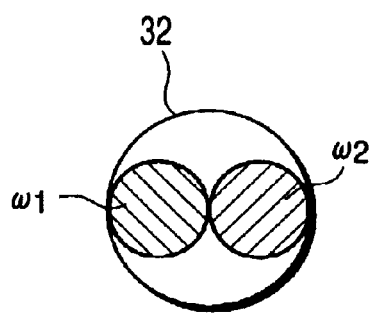
FIG. 2A is a schematic diagram showing a state in which a laser beam is made incident on a pupil of an objective lens.

Moreover, relay lenses 28, 30, for relaying the incident beams $\omega_1$, $\omega_2$, are disposed on the optical paths of the beams $\omega_1$, $\omega_2$. An objective lens 32, onto which the beams $\omega_1$, $\omega_2$ are incident as shown in FIG. 2A, is disposed in front of the emission of the two beams $\omega_1$, $\omega_2$ which have passed through the relay lens 30. The irradiating mechanism 33 is formed in this way.

As shown in FIG. 1, the sample 34 such as, for example, a living organism tissue or the like, is held at a motor-operated XY stage 35 in front of the emission of the beams $\omega_1$, $\omega_2$ which have transmitted through the objective lens 32. It is preferable for the motor-operated XY 35 stage to be able to move finely such as, for example, in steps of the nanometer order, and to be able to move at a speed of an appropriate range in two directions (the XY directions). The objective lens 32 condenses and irradiates the pump beam $\omega_1$ and the Stokes beam $\omega_2$ onto the sample 34. An anti-Stokes beam (anti-Stokes Raman scattering spectrum) $\omega_3$ is emitted from the sample 34.

On the optical path of the pump beam $\omega_1$ and the Stokes beam $\omega_2$ which have transmitted through the sample 34 and the anti-Stokes beam $\omega_3$ which has emitted from the sample 34, a condenser lens 36 condensing the various types of incident beams $\omega_1$, $\omega_2$, $\omega_3$ at a predetermined focal length is provided. In front of the emission of the beams $\omega_1$, $\omega_2$, $\omega_3$ which have transmitted through the condenser lens 36, a wavelength selecting filter (beam selecting mechanism) 38 is provided. The wavelength selecting filter 38 blocks the pump beam $\omega_1$ and the Stokes beam $\omega_2$ and allows only the anti-Stokes beam $\omega_3$ to pass through. A photo detector 40 is provided on the optical path of the transmitted anti-Stokes beam $\omega_3$.

Here, the motor-operated XY stage 35 is moved, and the sample 34 is scanned at an appropriate speed in the XY directions relative to the pump beam $\omega_1$ and the Stokes beam $\omega_2$. Therefore, brightness information of the two-dimensional anti-Stokes beam $\omega_3$ of the sample 34 is obtained. Namely, the motor-operated XY stage 35 works as a scanning mechanism.

A position signal of the motor-operated XY stage 35 and an optical signal of the anti-Stokes beam $\omega_3$ detected by the photo detector 40 are processed by a signal processor 41. The position signal and the optical signal are converted to electric signals, and an anti-Stokes Raman scattering image (observed image) of the sample 34 is formed and displayed on a display section 43.

Note that the Stokes beam $\omega_2$ is tuned to within 620 nm to 680 nm such that the different of the angular frequency between the pump beam $\omega_1$ and the Stokes beam $\omega_2$ ($\omega_2-\omega_1$) is coincident with the angular frequency of the molecular vibration which is activated by the Raman effect. The Stokes beam $\omega_2$ and the pump beam $\omega_1$ are pulse-oscillated. The optical delay device 14 is adjusted such that these pulses are simultaneously irradiated onto the sample 34.

In the first embodiment, the plane parallel body 24 is held so as to be rotatable. The interval between the optical axes of the pump beam $\omega_1$ and the Stokes beam $\omega_2$ can be freely changed. Thus, because the incident angles of the both beams $\omega_1$, $\omega_2$ with respect to the sample 34 are changed, the resolution in the direction of the optical axis in the region where the anti-Stokes beam $\omega_3$ arises can be adjusted. At this time, due to the mirror 26 being moved, the positions of the both beams $\omega_1$, $\omega_2$ are adjusted so as to match the pupil of the objective lens 32.

As described above, the following can be said about this embodiment.

The pump beam $\omega_1$ and the Stokes beam $\omega_2$ are emitted via the optical fiber 20, and overlapping of the positions of these beams $\omega_1$, $\omega_2$ can be ensured at the condensing position of the objective lens 32. Namely, generation of misalignment is suppressed. Accordingly, only the pump beam $\omega_1$ and the Stokes beam $\omega_2$ which contribute to the emission of the anti-Stokes beam $\omega_3$ are irradiated onto the sample 34. Thus, irradiation of excess laser beams onto the sample 34 is prevented. In particular, damage to living organism cells or tissues is suppressed. Accordingly, this is extremely advantageous in cases of observing living organism cells or tissues. Further, because irradiation of excess laser beams is prevented, the detection signal can be detected stably at a high SN ratio.

Further, even if misalignment occurs due to effects such as changes in the environment temperature, vibration, or the like, only the incident efficiency of the laser beams $\omega_1$, $\omega_2$ on the optical fiber 20 is affected. Thus, effects on the overlapping of the positions of the beams $\omega_1$, $\omega_2$ at the condensing position of the objective lens 32 can be prevented. Accordingly, the detection signal can be detected stably at a high SN ratio.

Namely, the present invention can provide the laser microscope 1 which can suppress generation of misalignment and detect the anti-Stokes beam $\omega_3$ at a high SN ratio, and which is ideal for observing the sample 34 such as living cells, tissues, or the like.

Next, a modified example of the first embodiment will be described.

The collimator lens 22 described above may have a zoom optical system (not shown), and the focal length may be made to be variable. In this configuration, the beam diameters of the pump beam $\omega_1$ and the Stokes beam $\omega_2$ which are incident on the objective lens 32 can be adjusted in accordance with the pupil diameter of the objective lens 32 used. Accordingly, the beams are incident at an ideal beam diameter even on, for example, the objective lens 32 having a larger pupil diameter than the objective lens 32 shown in FIG. 2A.

Figure 2B:
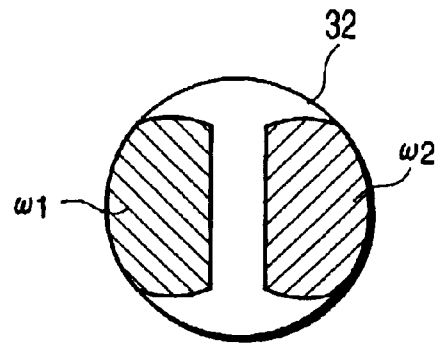
FIG. 2B is a schematic diagram showing a state in which a laser beam is made incident on a pupil of an objective lens when a shielding member shown in FIG. 3 is provided.
Figure 3:
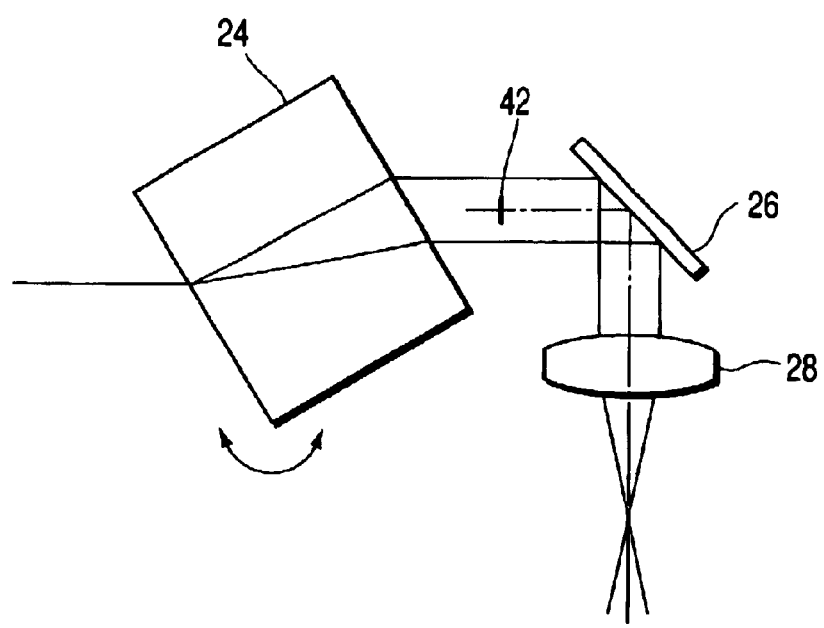
FIG. 3 is a schematic diagram when the shielding member for partially blocking a beam is provided on an optical path.

As shown in FIG. 3, the shielding member 42, functioning as a pupil modulating mechanism partially provided in the midst of the optical path, may be provided. A part of at least one of the two beams $\omega_1$, $\omega_2$ is blocked by the shielding member 42. These beams $\omega_1$, $\omega_2$ are, as shown in FIG. 2B, incident on the pupil of the objective lens 32. In this case, because the pump beam $\omega_1$, and the Stokes beam $\omega_2$ do not intersect other than at the focal point position of the objective lens 32, the anti-Stokes beam $\omega_3$ having a high spatial resolution can be obtained.

Note that the state shown in FIG. 2B shows that the shielding member 42 is provided substantially at the center between the pump beam $\omega_1$, and the Stokes beam $\omega_2$, and a part of both beams $\omega_1$, $\omega_2$ is blocked. The pupil modulating mechanism may be structured such that the shielding member 42 is positioned toward one of the pump beam $\omega_1$, and the Stokes beam $\omega_2$, and only one beam is blocked. In this way, the power of the laser beams $\omega_1$, $\omega_2$ is adjusted by using the shielding member 42. Therefore, the laser microscope 1 is effectively used.

Next, a second embodiment of the invention will be described by using FIG. 4. Hereinafter, members which have similar effects and functions as members described in the first embodiment are denoted by the same reference numerals as the reference numerals used in the first embodiment, and detailed description thereof will be omitted.

Figure 4:
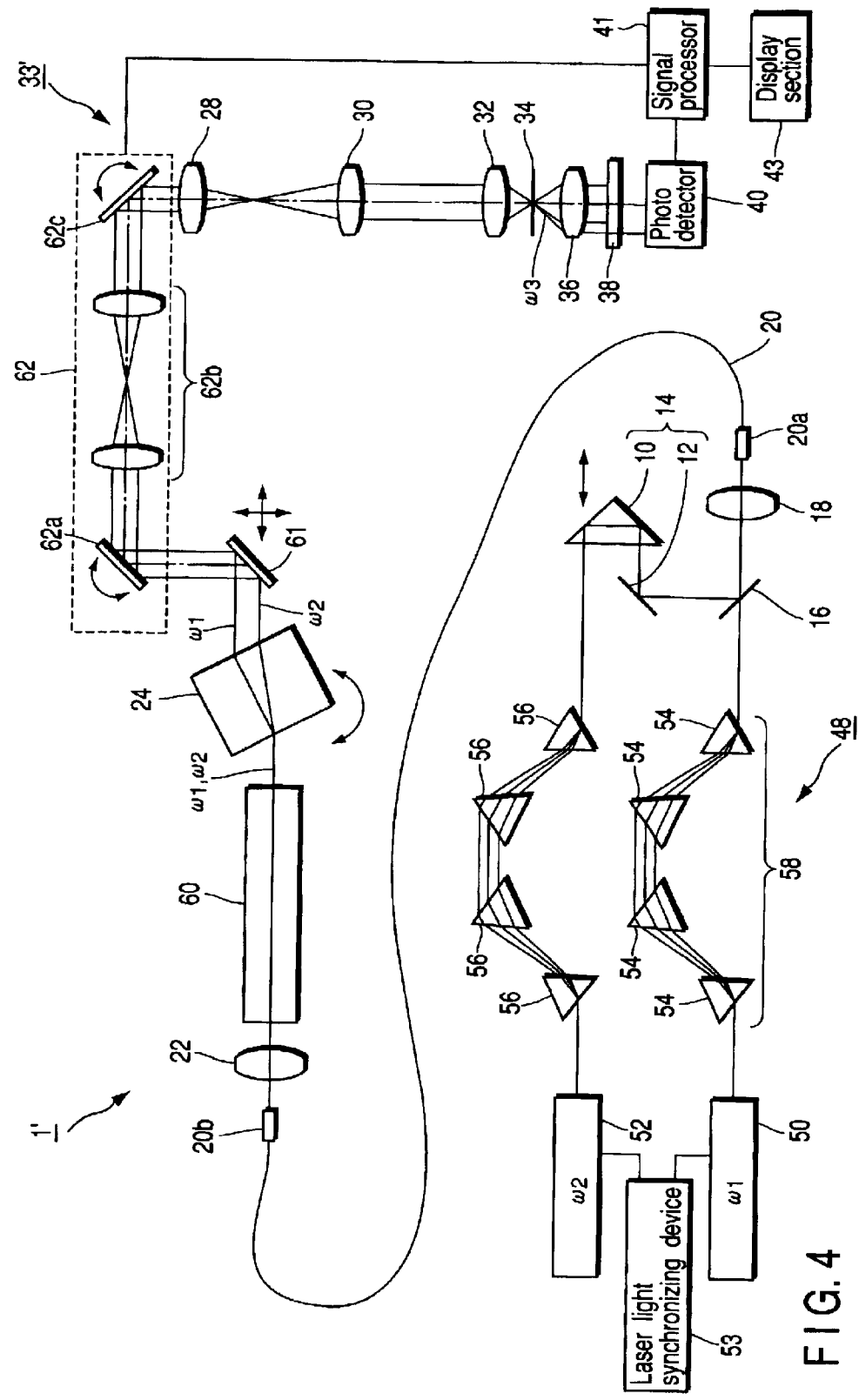
FIG. 4 is a schematic diagram showing a structure of a laser microscope according to a second embodiment of the present invention.
Figure 5:
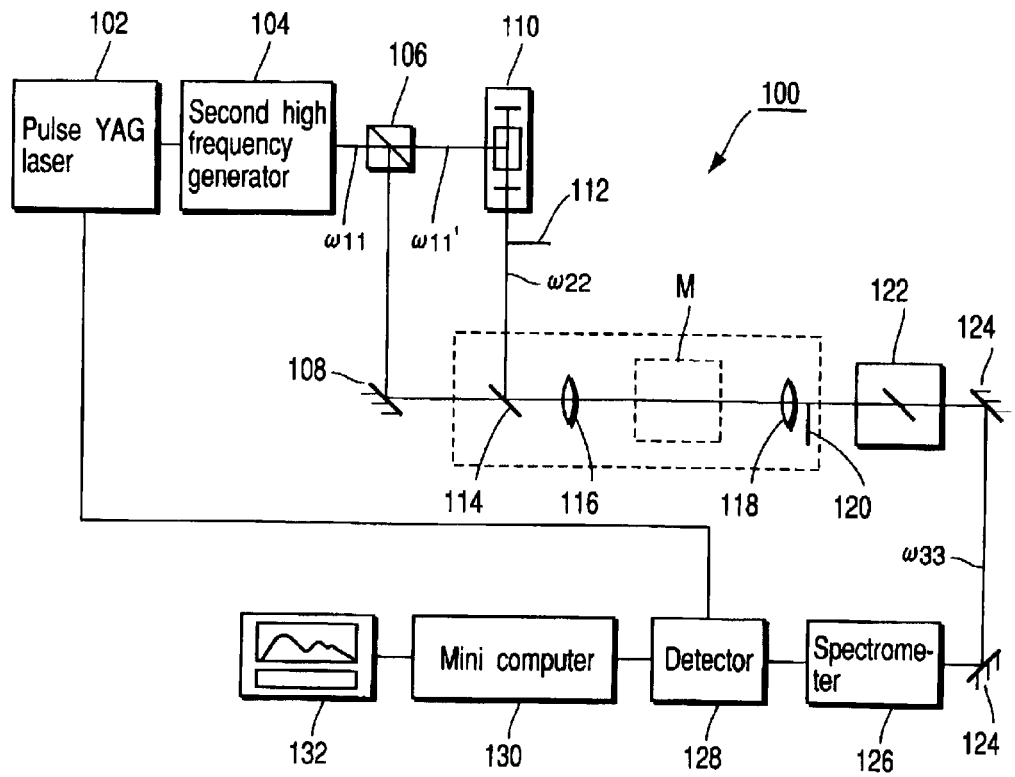
FIG. 5 is a schematic diagram showing a structure of a conventional laser measuring device.
Figure 6:
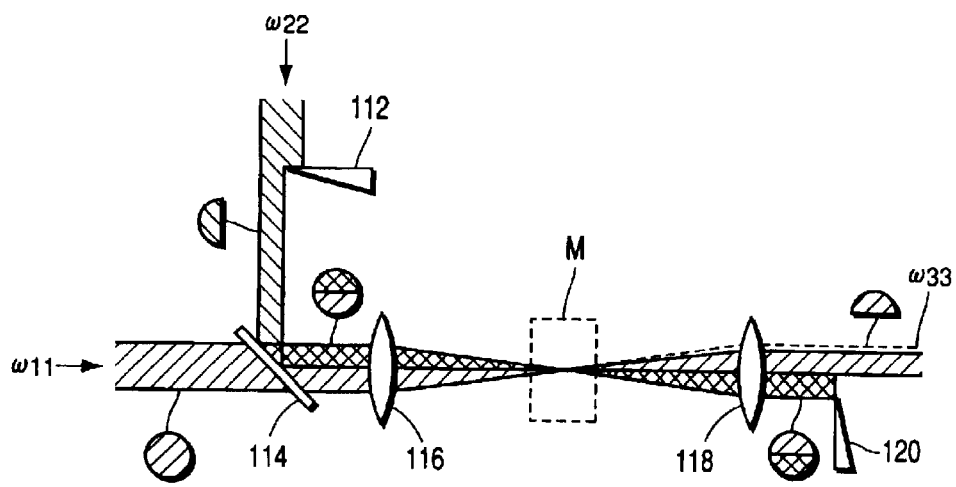
FIG. 6 is a schematic diagram showing a main portion of the laser measuring device shown in FIG. 5.

As shown in FIG. 4, the laser microscope 1' has a mode-locked titanium sapphire laser 50 and an optical parametric oscillator 52 as a laser beam emitting system 48.

The mode-locked titanium sapphire laser 50 emits the pump beam $\omega_1$ (wavelength of 850 nm) having a predetermined frequency, in a predetermined direction from a light-emitting opening (not shown). Further, a mode-locked titanium sapphire laser (not shown) is connected to the optical parametric oscillator 52. The Stokes beam $\omega_2$ (whose wavelength can be modulated between 1100 nm to 1350 nm), whose frequency is different from that of the pump beam $\omega_1$, is emitted in a predetermined direction from a light-emitting opening (not shown) of the optical parametric oscillator 52.

Both of the laser 50 and oscillator 52 comprises a laser light synchronizing device 53 which synchronizes and oscillates pulses at a repeat frequency of, for example, 82 MHz. Accordingly, the pump beam $\omega_1$ and the Stokes beam $\omega_2$ respectively oscillated from the laser 50 and oscillator 52 are synchronized and oscillated by the laser light synchronizing device 53. Note that the laser 50 and oscillator 52 oscillate ultrashort pulses whose pulse width is about 100 fs to 150 fs.

Two pairs of prisms 54, 56 are respectively provided on the optical paths of the pump beam $\omega_1$ and the Stokes beam $\omega_2$ respectively emitted from the laser 50 and oscillator 52, as a dispersion compensating optical system 58. The prisms 54, 56 of each pair are respectively disposed at predetermined intervals and so as to be inclined at a predetermined angle with respect to the adjacent prism. Further, these prisms 54, 56 generate a negative dispersion for the respective beams $\omega_1$, $\omega_2$. This dispersion compensating optical system 58 will be described later.

The Stokes beam $\omega_2$ emitted from the prisms 56 is reflected by the dichroic mirror 16 via the optical delay device 14 shown in FIG. 1 and described in the first embodiment. Further, the pump beam $\omega_1$ and the Stokes beam $\omega_2$ are merged, and condensed by the condenser lens 18. In this way, the laser light emitting system 48 is formed.

The beams $\omega_1$, $\omega_2$ are transmitted to an irradiating mechanism 33' through the optical fiber (a single mode fiber) 20 at the condensing position.

The irradiating mechanism 33' firstly makes the beams $\omega_1$, $\omega_2$, which are incident via the collimator lens 22, into parallel beams. In front of the collimator lens 22, a high-dispersion glass 60 such as, for example, SF10 is provided. The high-dispersion glass 60 works as a dispersion compensating optical system generating a positive dispersion. The dispersion compensating optical system will be described later.

Further, the beams $\omega_1$, $\omega_2$ are emitted in parallel to the beams $\omega_1$, $\omega_2$ through the plane parallel body 24 shown in FIG. 1 and explained in the first embodiment.

On the optical path of these two beams $\omega_1$, $\omega_2$, a movable mirror 61 is provided. The movable mirror 61 is provided in order to lead the two beams $\omega_1$, $\omega_2$ onto the sample 34, and is configured so as to be movable in the directions of the arrows in FIG. 4.

Next, on the optical path of the two beams $\omega_1$, $\omega_2$ reflected by the movable mirror 61, an X-Y scanning device 62 having two scanning mirrors 62a, 62c is provided. The scanning mirror 62a is swung in direction X. The scanning mirror 62a scans the two beams $\omega_1$, $\omega_2$ from the movable mirror 61 in direction X on the sample 34. In the same way, the scanning mirror 62c is swung in a direction perpendicular to the swinging of the scanning mirror 62a, namely, in direction Y. The scanning mirror 62c scans the two beams $\omega_1$, $\omega_2$ from the scanning mirror 62a in direction Y on the sample 34.

A pair of relay lenses 62b are provided on the optical path of these two beams $\omega_1$, $\omega_2$ between the two scanning mirrors 62a, 62c. By these relay lenses 62b, the two beams $\omega_1$, $\omega_2$ scanned in the direction X by the scanning mirror 62a are relayed to the scanning mirror 62c.

In this way, these beams $\omega_1$, $\omega_2$ light-deflected in the X-Y direction at the X-Y scanning device 62 are incident on the objective lens 32 via the relay lenses 28, 30. The two beams $\omega_1$, $\omega_2$ reflected by the mirrors 62a, 62c are projected onto the pupil position of the objective lens 32. Namely, in the same way as the first embodiment, as shown in FIG. 2A, these two beams $\omega_1$, $\omega_2$ are incident on the objective lens 32. In this way, the irradiating mechanism 33' is formed.

The objective lens 32 condenses and irradiates the incident pump beam $\omega_1$ and the Stokes beam $\omega_2$ onto the sample 34. Therefore, the anti-Stokes beam (anti-Stokes Raman scattering light) $\omega_3$ is emitted from the sample 34.

As shown in FIG. 1 described in the first embodiment, the condenser lens 36 and the wavelength selecting filter 38 are provided on the optical paths of the pump beam $\omega_1$, the Stokes beam $\omega_2$, and the anti-Stokes beam $\omega_3$ which have passed through the sample 34. Thus, only the anti-Stokes beam $\omega_3$ passes through. Further, as described in the first embodiment, the anti-Stokes beam $\omega_3$ is detected at the light detector 40.

A scanning signal of the X-Y scanning device 62 and an optical signal of the anti-Stokes beam $\omega_3$ detected by photo detector 40 the are converted to electric signals by the signal processor 41. An anti-Stokes Raman scattering image (observed image) of the sample 34 is displayed on the display section 43.

Note that, the Stokes beam $\omega_2$ is tuned within 1100 nm to 1350 nm such that the difference in the angular frequency between the pump beam $\omega_1$ and the Stokes beam $\omega_2$ ($\omega_2-\omega_1$) is coincident with the angular frequency of the molecular vibration which is activated by the Raman effect. Further, the Stokes beam $\omega_2$ and the pump beam $\omega_1$ are pulse-oscillated. Therefore, the optical delay device 14 is adjusted such that these pulses are simultaneously irradiated onto the sample 34.

Next, the above-described dispersion compensating optical systems 58, 60 will be described.

When high density light whose pulse width is about 100 fs to 150 fs is transmitted to the single mode fiber 20, self phase modulation occurs. Therefore, there is the possibility that the original pulse width cannot be reproduced even if an appropriate dispersion compensation is carried out after the beams $\omega_1$, $\omega_2$ are emitted from the fiber 20. The stronger the laser output, the more marked this phenomenon.

Here, in the second embodiment, the dispersion compensating optical system 58 which can provide a large negative dispersion is disposed on each optical path of the pump beam $\omega_1$ and the Stokes beam $\omega_2$, such that the beams $\omega_1$, $\omega_2$ emitted from the single mode fiber 20 are emitted at a pulse width of a picosecond level.

Further, as the amount of negative dispersion of the dispersion compensating optical system 58, a value offsetting the sum of the amounts of dispersion of the optical elements disposed on the respective optical paths is preferably selected.

However, in this embodiment, the total of the amounts of the dispersion from the condenser lens 18 to the collimator lens 22 and from the plane parallel body 24 to the objective lens 32 does not reach a value offsetting the dispersion of the dispersion compensating optical system 58. Therefore, the high-dispersion glass 60, which can provide a positive dispersion, such as, for example, SF10, is disposed on the optical path.

Therefore, the pump beam $\omega_1$ and the Stokes beam $\omega_2$ respectively emitted from the laser 50 and the oscillator 52, are emitted from the objective lens 32 without being widened the laser pulse width. The pump beam $\omega_1$ and the Stokes beam $\omega_2$ are irradiated onto the sample 34.

Further, the light pulses spreading at the picosecond level are transmitted to the single mode fiber 20, and therefore, it is difficult for the problem of self phase modulation to occur. Therefore, the pulse width of the laser beam emitted from the objective lens 32 is substantially reproduced as the pulse widths respectively emitted from the laser 50 and the oscillator 52.

Because the anti-Stokes Raman scattering is a nonlinear optical process, by using the laser 50 and the oscillator 52 as described above, ultrashort pulse laser beams $\omega_1$, $\omega_2$ are irradiated onto the sample 34 at a high photon density. Therefore, a strong anti-Stokes beam $\omega_3$ is emitted from the sample 34. Accordingly, data having a high SN ratio can be obtained. This shows that data acquisition is possible even if a laser having a low average output is used. Therefore, the present invention is extremely advantageous when the sample 34 is a living organism sample or the like.

As described above, the following can be said about this embodiment.

By using laser light having a large peak output and an extremely short pulse width, i.e., a laser whose average output is low, damage to living organism cells or tissues can be prevented, and the detection signal can be detected stably at a high SN ratio. That is, it is possible to provide the laser microscope 1' which can detect the anti-Stokes beam $\omega_3$ at a high SN ratio by suppressing generation of misalignment, and which is ideal for observing the sample 34 such as living cells, tissues or the like.

Moreover, hereinafter, a modified example of the second embodiment will be described.

Several modified examples of the above-described dispersion compensating optical systems 58, 60 can be mentioned. Before the two beams $\omega_1$, $\omega_2$ are incident on the single mode fiber 20, a dispersion member (for example, a high-dispersion glass such as SF10) generating positive dispersion may be disposed. After the two beams $\omega_1$, $\omega_2$ are emitted from the single mode fiber 20, an optical system, such as the four prisms, for example, which generates a negative dispersion may be disposed. Further, diffraction gratings may be used in place of the prisms.

When the laser output is extremely low and the self phase modulation of the single mode fiber is not a problem, the member generating positive dispersion may be eliminated. Further, a dispersion compensating optical system, which can provide a negative dispersion offsetting the total of the amounts of the dispersion from the condenser lens 18 to the objective lens 32, may be disposed on each optical path of the beams $\omega_1$, $\omega_2$.

The first and second embodiments were described by using the single mode fiber 20 as the optical fiber. However, as the fiber, not only fibers which fall within the scope of single mode fibers, but also, fibers other than the fibers used in the first and second embodiments can be used, provided that they fall within an a scope of fibers which can be treated substantially as single mode fibers.

Further, a fiber which is a single mode fiber and in which the plane of polarization is stored may be used. Therefore, when a laser beam is linearly polarized, the polarized light is held, and even if the curved state of the fiber changes, there is little fluctuation, and acquisition of data can be carried out stably.

Moreover, in the first and second embodiments, the optical systems shown in FIGS. 1 and 4, respectively, were described. However, these optical systems are examples, and other optical systems may of course be used provided that they fall within a range which does not deviate from the gist.

In the first and second embodiments, the irradiating mechanism 33, 33' shown in FIGS. 1 and 4, respectively, is described. However, such irradiating mechanism 33, 33' is an example, and other irradiating mechanism may of course be used provided that they fall within a range which does not deviate from the gist.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A laser microscope comprising:
   a laser light emitting system which emits a pump beam and a Stokes beam having different frequencies;
   a common optical fiber having a first end on which the pump beam and the Stokes beam emitted from the laser light emitting system are incident and a second end from which the pump beam and the Stokes beam are emitted;
   a beam irradiating mechanism which includes an objective lens and which condenses and irradiates the pump beam and the Stokes beam emitted from the second end of the optical fiber onto a sample via the objective lens, thereby causing an anti-Stokes beam to be emitted from the sample;
   a photo detector which detects the anti-Stokes beam emitted from the sample; and
   a beam selecting mechanism which prevents the pump beam and the Stokes beam from being received on the photo detector.

2. A laser microscope according to claim 1, wherein the optical fiber comprises a single mode fiber.

3. A laser microscope according to claim 1, wherein the beam irradiating mechanism compares a pupil modulating mechanism which blocks a part of at least one of the pump bemin and the Stokes beam.

4. A laser microscope according to claim 1, further comprising a scanning mechanism by which the sample is relatively scanned by the pump beam and the Stokes beam.

5. A laser microscope according to claim 4, wherein the scanning mechanism comprises a stage which holds the sample and is movable in at least one direction.

6. A laser microscope according to claim 4, wherein the scanning mechanism is provided on an optical path of the pump beam and the Stokes beam.

7. A laser microscope according to claim 1, wherein the laser light emitting system comprises:
   one laser light source which emits a beam having a predetermined frequency and a predetermined wavelength;
   a beam splitter which separates the beam emitted from the laser light source into two beams; and
   two lasers which convext respective frequencies and wavelengths of the two beams Separated by the beam splitter to have different predetermined values, and which respectively emit the pump bean and the Stokes beam.

8. A laser microscope according to claim 7, further comprising an optical delay device on an optical path of the Stokes beam.

9. A laser microscope according to claim 7, wherein the optical fiber comprises a single mode fiber.

10. A laser microscope according to claim 7, wherein the beam irradiating mechanism comprises a pupil modulating mechanism which blocks a part of at least one of the pump beam and the Stokes beam.

11. A laser microscope according to claim 1, wherein the laser light emitting system comprises:

two lasers which respectively emit the pump beam and the Stokes beam; and a dispersion compensating optical system provided in an optical path of each of the pump beam and the Stokes beam to compensate for dispersion of the pump beam and the Stokes beam.

12. A laser microscope according to claim 11, wherein one of the dispersion compensating optical systems comprises at least one prism.

13. A laser microscope according to claim 11, wherein one of the dispersion compensating optical systems comprises a high dispersion glass.

14. A laser microscope according to claim 1, wherein the laser light emitting system comprises:

two lasers which respectively emit the pump beam and the Stokes beam; and an optical delay device on an optical path of the Stokes beam.

15. A laser microscope according to claim 11, further comprising an optical delay device on the optical path of the Stokes beam.

16. A laser microscope according to claim 11, further comprising a scanning mechanism which causes the pump beam and the Stokes beam to be scanned on the sample, and which is provided on an optical path of the pump beam and the Stokes beam.

17. A laser microscope according to claim 16, further comprising another scanning mechanism which holds the sample and which is movable in at least one direction to scan the sample with respect to the pump beam and the Stokes beam.

18. A laser microscope according to claim 11, wherein the beam irradiating mechanism comprises a pupil modulating mechanism which blocks a part of at least one of the pump beam and the Stokes beam.

* * * * *